United States Patent [19]

Jackson, deceased et al.

[11] 4,155,410

[45] May 22, 1979

[54] METHOD FOR CORRECTING LOST CIRCULATION

[75] Inventors: Junius M. Jackson, deceased, late of Houston, Tex., by Betty A. Jackson, coexecutor; by First City National Bank of Houston, coexecutor, Houston, Tex.

[73] Assignee: Brinadd Company, Houston, Tex.

[21] Appl. No.: 919,142

[22] Filed: Jun. 26, 1978

[51] Int. Cl.² ............................................. E21B 21/00
[52] U.S. Cl. .......................................... 175/66; 175/69; 175/72
[58] Field of Search ................... 175/66, 69, 71, 72, 175/24, 205, 206; 252/8.5 A, 8.5 B, 8.5 C, 8.5 P; 166/309

[56] References Cited

U.S. PATENT DOCUMENTS

| | | | |
|---|---|---|---|
| 2,726,063 | 12/1955 | Ragland et al. | 175/69 |
| 2,818,230 | 12/1957 | Davis | 165/104 R |
| 3,040,820 | 6/1962 | Gallus | 175/66 |
| 3,297,098 | 1/1967 | Elman et al. | 175/69 |
| 3,303,895 | 2/1967 | Fontenot | 175/66 |
| 3,313,362 | 4/1967 | Schneider | 175/71 |
| 3,387,672 | 6/1968 | Cook | 175/69 |
| 3,493,059 | 2/1970 | Cox | 175/24 |
| 3,844,361 | 10/1974 | Jackson | 175/66 |
| 3,852,201 | 12/1974 | Jackson | 175/66 X |
| 4,013,568 | 3/1977 | Fischer et al. | 175/69 X |

*Primary Examiner*—Stephen J. Novosad
*Attorney, Agent, or Firm*—Kenneth H. Johnson

[57] ABSTRACT

Lost circulation in a well occurring during drilling is reduced by aeration of clay-free, non-thixotropic, brine wellbore fluids comprising hydroxyalkyl cellulose and preferably magnesia as a stabilizer. The gas is easily and completely removed from the foam returned to surface with only a conventional degassing and gas busting equipment normally found in a solids removal system. The advantages of the clay-free, non-thixotropic, drilling fluids as known are preserved and the system allows rapid change from aerated to non-aerated fluid as required.

10 Claims, No Drawings

METHOD FOR CORRECTING LOST CIRCULATION

BACKGROUND OF THE INVENTION

1. Field of the Invention

The present invention relates to the drilling of wells, such as oil and gas wells, and more particularly relates to a method for preventing or minimizing the loss of drilling fluid from a wellbore into porous and permeable formations and for correcting so-called lost circulation of drilling fluids in said well by the use of specific aerated clay-free, non-thixotropic, drilling fluids.

2. Prior Art

In rotary drilling, a bit is attached to the lower end of a hollow drill stem with a fluid circulated down the drill stem, through a passageway in the drill bit and then up an annulus between the drill stem and the wall of the wellbore. Since the drilling fluid is usually circulated in the borehole under a pressure greater than that of the formation, the liquid component of the fluid tends to flow into the permeable formations through the interstices, passages or pores within the formation, however, various fluid loss materials such as lignosulfonate salts, starches and modified starches, or suspended clay particles have been used to reduce this type of fluid loss.

In many cases, however, the amounts of drilling fluid lost from the borehole to the formation depends less on the nature of the fluid loss additives and their manner of reducing such flow, than on the structural characteristics of the strata traversed in the well and on the natural pressure of the fluids in said permeable strata. Thus, in low pressure, highly permeable, porous formations, and especially formations having fissures, cavities or crevices, the fluids easily pass through into the formation, with the result that large volumes of the drilling fluid are lost, causing a loss in circulation of the fluid, which may, in turn, lead to the cessation of drilling, the freezing of the drill string, the collapse of the walls of the borehole, or other undesirable consequences.

The problem of lost circulation is frequently caused or enhances by the weight of the drilling fluid column in the borehole which may exceed the natural formation pressure. This problem has been handled by injecting or incorporating a gasiform fluid, e.g., air or other gas into clay-based, thixotropic drilling fluid.

In the drilling fluid class, clay-based fluids have for years preempted the field, because of the traditional and widely held theory in the field that the viscosity suitable for creating a particle carrying capacity in the drilling fluid could be achieved only with a drilling fluid having thixotropic properties, that is, the viscosity must be supplied by a material that will have sufficient gel strength to prevent the drilled particles from separating from the drilling fluid when agitation of the drilling fluid has ceased, for example, in a holding tank at the surface.

In order to obtain the requisite thixotropy or gel strength, hydratable clay or colloidal clay bodies such as bentonite or fuller's earth have been employed. As a result the drilling fluids are usually referred to as "muds." The use of clay-based drilling muds has provided the means of meeting the two basic requirements of drilling fluids, i.e., cooling and particle removal. However, the clay-based drilling muds have created problems for which solutions are needed. For example, since the clays must be hydrated in order to function, it is not possible to employ hydration inhibitors, such as calcium chloride, or if employed, their pressence must be at a level which will not interfere with the clay hydration. In certain types of shales generally found in the Gulf Coast area of Texas and Louisiana, there is a tendency for the shale to disintegrate by swelling or cracking upon contact with the water if hydration is not limited. Thus, the uninhibited clay-based drilling fluids will be prone to shale disintegration.

The drilled particles and any heaving shale material will be hydrated and taken up by the conventional clay-based drilling fluids. The continued addition of extraneous hydrated solid particles to the drilling fluid will increase the viscosity and necessitated costly and constant thinning and reformulation of the drilling mud to maintain its original properties.

Another serious disadvantage of the clay-based fluids is their susceptibility to the detrimental effect of brines which are often found in drilled formations, particularly Gulf Coast formations. Such brines can have a hydration inhibiting effect, detrimental to the hydration requirement for the clays.

Other disadvantages of clay-based drilled fluids are their (1) tendency to prevent the escape of gas bubbles, when the viscosity of the mud rises too high by the incidental addition of hydratable material, which can result in blow-outs; (2) the need for constant human control and supervision of the clay-based fluids because of the expectable, yet unpredictable, variations in properties; and (3) the formation of a thick cake on the internal surfaces of the wellbore.

These widely used clay-based fluids have been aerated to reduce their density and avoid fluid loss as shown for example, in U.S. Pat. Nos. 2,726,063; 2,818,230 and 3,313,362. However, the disadvantages outlined above are not relieved by aeration and additional problems occur from the aeration. The existance of the gel strength in a drilling fluid make it quite difficult to free the air from the fluid for recycling to the borehole. Unless, a substantial amount of the entrained air is removed from the fluid, the mud pumps cannot pressure up the fluid in their cylinders properly in order to obtain circulation of the whole fluid, i.e., the pumps can not suck enough whole fluid into their intake pipe. Hence, either special treatment of the clay containing fluids is required to remove the entrained gas or over capacity pumps must be employed. Since the aerated drilling fluid in many instances is not needed or employed in the entire drilling operation the clay, thixotropic drilling fluids require extra expense.

The use of gases alone as the drilling fluids avoids the inherent problems of the clay muds, however, the usefulness of gases as drilling fluids is limited. When the formation contains water or hydrocarbons, for example, these liquids seep into the borehole and wet the bore cuttings, which tend to gum and ball on the bit and form mud rings on tools which disrupt the circulation of the gas.

To overcome these problems and those of the muds, some specialized aeration fluids have been proposed. For example, U.S. Pat. No. 3,297,098 discloses the use of foams incorporating a phosphate ester which foams in fresh water and brines; U.S. Pat. No. 3,738,437 discloses a clear fluid such as a brine containing partially hydrolyzed polyarylamides, and U.S. Pat. No. 4,013,568 which discloses water or brine, containing a lignite and a high molecular weight acrylic acid polymer.

It is an advantage of the present invention that a method of drilling with a gas containing fluid is provided which uses a general purpose drilling fluid which is equally suitable for drilling with said gas.

SUMMARY OF THE INVENTION

Briefly stated, the present invention is in the method of drilling a well with a liquid drilling fluid in a subterranean formation characterized as having structure resulting in lost circulation of said liquid drilling fluid comprising pumping said drilling fluid into said well through a drill stem, aerating said drilling fluid with a gas after said pumping, circulating said aerated drilling fluid through said drill stem and a drill bit into said well and returning said aerated drilling fluid to the surface through an annulus between said subterranean formation and said drill stem, removing said gas and any drilled particles from said drilling fluid and recirculating said cleaned up fluid having entrained gas removed therefrom, to said well by pumping, wherein the improvement comprises using a clay-free, non-thixotropic brine fluid consisting essentially of a viscosifying amount of water soluble non-ionic hydroxyalkyl cellulose, preferably hydroxyethyl cellulose (HEC) therein. Preferably a stabilizing amount of magnesia (MgO) or magnesium hydroxide is also present in the drilling fluid to stabilize the viscosity increasing effect of the hydroxyalkyl cellulose, magnesia being more preferred.

The present invention will not eliminate lost circulation in all situations, it will however, provide a means for correcting or reducing lost circulation to allow successful completion of the drilling.

The basic drilling fluid of HEC with or without magnesia is well known and is described in U.S. Pat. No. 3,852,201 (Jackson) which is incorporated herein.

The term "viscosifying amount" means an amount to increase the viscosity of the fluid above that of the fluid without the hydroxyalkyl cellulose. The term "stabilizing amount" means an amount of magnesia or magnesium hydroxide which will maintain the properties of a drilling fluid viscosified with hydroxyalkyl cellulose in use beyond those of a fluid not containing magnesia or magnesium hydroxide.

DETAILED DESCRIPTION AND PREFERRED EMBODIMENT OF THE INVENTION

The aerated drilling fluid most desirably will fulfill all of the needs of an unaerated fluid with the extra advantage that the lost circulation will be reduced.

The fluid, as noted above, must be conditioned so that the drilled particles do not hydrate and then swell or disintegrate into the fluid system. The addition of an electrolyte to form a brine accomplishes this. Preferably a brine contains at least 1.0% by weight of a soluble salt of potassium, sodium or calcium in water. In addition, the brine may contain other soluble salts, for example, cation of the other alkali metals and alkaline earth metals, zinc, chromium, iron, copper and the like. Generally, the chlorides are employed because of availability, but other salts such as the other halides, sulfates and the like may be used. The soluble salts of the brine, not only furnish the weighting material by adjusting the density of the solution, but also typically furnish the cations for inhibiting the fluid against hydration of solid materials.

The fluid must have neither thixotropic properties nor a structured type viscosity (such as provided by physical rather than physico-chemical means of which asbestos and attapulgite are exemplary), so that both drilled solids and also entrained gases are not hindered. Their viscosities are characterized by high flat gel strengths, that is, there is little change in viscosity when agitated and initial gel strength is high and constant.

Finally the drilling fluid must supply the properties needed for drilling, including carrying capacity, fluid lost control and sufficient density, when needed, to keep formation fluids out of the well.

The present non-thixotropic clay-free brines containing HEC as a viscosifier in viscosfying amounts meet all of these obviously desirable criteria and additionally it is readily aerated and degassed. Hence, should the conditions in the well change from those requiring an aerated fluid to those requiring a high density fluid, this is readily achieved by merely secessation of the gas into the fluid. Since the pumped fluid is substantially free of gas (the gas escapes readily on return of the fluid to the surface into the holding pits) the change in fluid density is accomplished as quickly as possible. In the same circumstance an aerated clay drilling fluid will have to be especially treated to remove the entrained gas or recirculated several times to finally be freed of the gas.

The gas added to the present drilling fluid is added after the fluid is pumped to the wellbore. This, allows the pumps to pump a total drilling fluid. The exact point of addition of the gas to the fluid is not critical, although it should be added at a point where the requisite or desired reduction in density and pressure in the wellbore, will be achieved. The gas may be injected or introduced into said drilling fluid, for example, down hole or above or below the kelley.

The gas itself may be any of those used in the prior art, e.g., air, formation gas, nitrogen, flue gas and the like. The techniques of adding gas are well known since they have been added to the prior art clay-based fluids for years. The amount of gas injected into a drilling fluid to reduce or overcome lost circulation depends on many factors, such as the density of the drilling fluid, the depth of the permeable formation and the level of the drilling fluid in the wellbore. For example, a 9 lb/gal fluid which is injected with 90% air so that air constitutes 90% of the aerated fluid, will produce a reduction in pressure of 600 lg/sq. in. at the bottom of a 5,000 foot well. This would be sufficient to reestablish the return of drilling fluid where a lost zone had previously caused the drilling fluid to stand at 1300 feet below the surface.

A preferred hydroxyalkyl cellulose is hydroxyethyl cellulose (HEC). Other suitable hydroxyalkyl cellulose compounds would include hydroxypropyl cellulose, di(hydroxyalkyl) cellulose such as di(hydroxyethyl) cellulose, di(hydroxypropyl) cellulose and the like.

Magnesia is a highly infusible magnesium oxide (MgO), prepared by the calcination of magnesium carbonate, ($MgCO_3$). Magnesia is only slightly soluble in water, e.g., 0.0086 grams/100 cc (86 ppm) of water at 30° C. and is essentially non-hydratable. One theory for the stability effectiveness is that the very slightly soluble magnesia which is present in excess of its solubility in the wellbore fluid provides a reservoir of basicity of just the correct amount to maintain the pH of the fluid in the range at which the hydroxyalkyl cellulose is most stable.

In addition to the hydroxyalkyl cellulose and magnesia other conventional wellbore additives can be present, serving their functions. For example, the alkali and alkaline earth lignosulfonate salts such as calcium lignosulfonate, sodium lignosulfonates serving as water loss additives, starches, gums, and oil also serving as water loss additives, density modifying material such as calcium chloride, sodium chloride and zinc chloride. In other words, any of the known additive materials may be added so long as the basic characteristics of the non-clay wellbore fluid are not changed.

The slight solubility of magnesia in wellbore fluids results in a very low magnesium ion concentration, that is, less than 0.001% or 10 ppm of magnesium ion concentration or dissolved magnesium, yet the pH remains in the range of about 8.5 to about 11 when employed in stabilizing amounts. The magnesia must be employed in at least a greater amount than is soluble in the given volume of aqueous material to which it is added to obtain the benefits of the invention. The excess of magnesia beyond that soluble in the wellbore fluid may have some effect not appreciated at this time in regard to the present invention. The minimum amount of magnesia employed is at least an excess beyond that magnesia which is soluble in wellbore fluid or greater than about 0.001% by weight based on the aqueous component, which is about 0.0035 pounds of magnesia per barrel (42 gallons).

In one embodiment, the magnesia is present in an amount of from about 0.10% by weight based on the aqueous portion of the wellbore fluid.

The amount of hydroxyalkyl cellulose will vary depending on drilling conditions for each site and the viscosity which the operator desires, which is a routine task. The amount of hydroxyalkyl cellulose in relation to the magnesia is not critical, and the viscosity achieved by the hydroxyalkyl cellulose will be stabilized by the amounts of magnesia specified. Preferably at least about 10 weight % of magnesia or magnesium hydroxide base on the combined weight with hydroxyalkyl cellulose is present, more preferably at least 25 weight %.

The present method was evaluated in Ute #3, La Plata County, Colo. The borehole was drilled with a conventional bentonite mud system down to 4,224 feet. At this point, a system of a total of about 7¾ pounds per barrel, composed of three proprietary additive packages of Brinadd Company, were added to a 14 ppb KCl brine to form a clay-free non-thixotropic well drilling fluid. The additive components were present as follows:

| Component | Wt. % |
|---|---|
| HEC | 11.3 |
| MgO | 15.86 |
| Calcium lignosulfonate | 28.72 |
| Lime | 0.46 |
| Chrome Alum | 1.01 |
| Sized CaCO3 | 29.46 |
| Hydroxypropyl ether corn starch | 6.57 |
| Cationic potato starch | 6.57 |

Analyst of this fluid gave the following physical properties: weight 8.7 ppg; Marsh Funnel=33 seconds; Plastic Viscosity=7 centipoise; Yield Point=4 lb/100 ft$^2$; pH=9.0 and API fluid loss=6.8 ml gel strength at 10 seconds and 10 minutes=0/2.

Three days after initial use of this fluid lost circulation became a substantial problem and aeration was begun at approximately 4,877 feet. The system was aerated by 600 to 750 cubic feet per minute of gas added through a second string located in the drill stem down hole. The gas used was air. This aerated system was used for about 13 days to a total depth of 8,998 feet. During this entire period lost circulation was a constant problem, so that in all about 30,000 barrels of fluid were prepared at the approximate concentration of about 5¼ pounds per barrel of 14 ppb KCl brine of an additive mix in the approximate* ratio of:

| Component | Wt. % |
|---|---|
| HEC | 15.09 |
| MgO | 13.88 |
| Calcium lignosulfonate | 27.64 |
| Lime | .46 |
| Chrome alum | .99 |
| Sized CaCO3 | 29.01 |
| Hydroxypropyl ether corn starch | 6.47 |
| Cationic potato starch | 6.47 |

*The rapid make-up of fluid resulted in more variation than would otherwise occur, however, the ratios given are representative of the drilling fluid at any given time.

Surface equipment for handling the returning aerated fluid (foam) were a conventional degasser and a gas buster. The return foam broke out quickly and completely.

Drilled solids were also readily separated in the conventional solids removal section, such that a clear, unaerated fluid was pumped from the suction tank back to the wellbore.

The advantages of the brine clay-free, non-thixotropic drilling fluid were obtained and preserved by the use of the fluid as described, whereas the successful aeration of the fluid allowed the well to be drilled by correcting the lost circulation at least in part. Without the aeration lost circulation of the fluid would have prohibited the drilling.

The invention claimed is:

1. In the method of drilling a well with a liquid drilling fluid in a subterranean formation characterized as having structure resulting in lost circulation of said liquid drilling fluid comprising:
    pumping said liquid drilling fluid into said well through a drill stem,
    aerating said liquid drilling fluid with a gas after said pumping,
    circulating said aerated liquid drilling fluid through said drill stem and a drill bit into said well and returning said aerated liquid drilling fluid to the surface through an annulus between said subterranean formation and said drill stem,
    removing said gas and any drilled particles from said drilling fluid and
    recirculating said cleaned up liquid drilling fluid having entrained gas and drilled particles removed therefrom to said well by pumping, wherein the improvement comprises using a brine, clay-free, non-thixotropic, drilling fluid consisting essentially of a viscosifying amount of water soluble, non-ionic hydroxyalkyl cellulose, whereby said lost circulation is reduced.

2. The method according to claim 1 wherein said liquid drilling fluid additionally contains a hydroxyalkyl cellulose stabilizing amount of magnesia or magnesium hydroxide.

3. The method according to claim 2 wherein at least 10 weight percent magnesia based on the combined weight of hydroxyalkyl cellulose and magnesia is present.

4. The method according to claim 3 wherein said hydroxyalkyl cellulose is hydroxyethyl cellulose.

5. The process according to claim 1 wherein said aeration is obtained by introducing a gas into said liquid drilling fluid.

6. The process according to claim 5 wherein said gas is introduced into said liquid drilling fluid down hole.

7. The process according to claim 6 wherein said gas is air, formation gas, nitrogen or flue gas.

8. The process according to claim 7 wherein said gas is nitrogen.

9. The process according to claim 7 wherein said gas is air.

10. The method according to claim 1 wherein said brine comprises at least 1% of a soluble salt of potassium, sodium or calcium in water.

* * * * *